G. L. SMITH, H. F. GRAVER & J. J. WIEGAND.
NUT LOCK.
APPLICATION FILED MAR. 11, 1909.

940,990.

Patented Nov. 23, 1909.

Witnesses

Inventors
George L. Smith,
Henry F. Graver,
John J. Wiegand.
By E. E. Vrooman,
Attorney.

UNITED STATES PATENT OFFICE.

GEORGE L. SMITH, HENRY F. GRAVER, AND JOHN J. WIEGAND, OF EAST TOLEDO, OHIO.

NUT-LOCK.

946,990.　　　　　　　　Specification of Letters Patent.　　Patented Nov. 23, 1909.

Application filed March 11, 1909. Serial No. 482,341.

*To all whom it may concern:*

Be it known that we, GEORGE L. SMITH, HENRY F. GRAVER, and JOHN J. WIEGAND, citizens of the United States, residing at East Toledo, in the county of Lucas and State of Ohio, have invented certain new and useful Improvements in Nut-Locks, of which the following is a specification, reference being had therein to the accompanying drawing.

This invention relates to nut and bolt locks, and the principal object of the same is to provide a device of the character stated in which the nut is positively held from rotating to an unlocked, or bolt-releasing, position by means of a novel type of washer, the washer in turn being held from rotary movement by means of a direct engagement with the work or article with which the bolt is engaged.

With the above and many other objects in view, the invention contemplates a device of the character stated which is composed of few parts and which may be cheaply and economically produced, and which will efficiently perform the functions for which they are designed.

In carrying out the objects of the invention it will of course be readily understood that the essential features thereof are susceptible of changes in details and structural arrangements, but one preferred and practical embodiment thereof is shown in the accompanying drawings, wherein—

Figure 1:
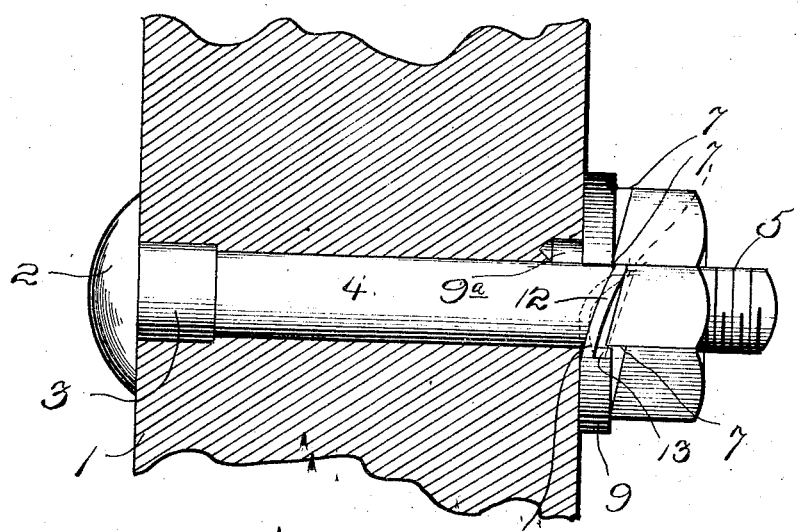
Figure 2:
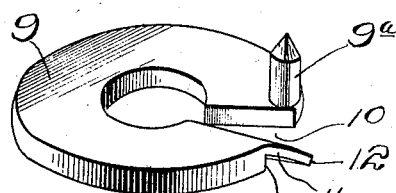
Figure 3:
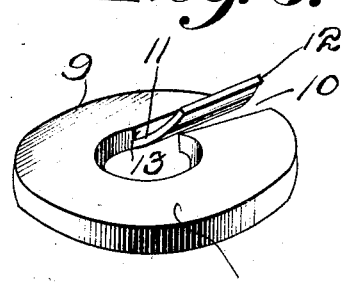
Figure 4:
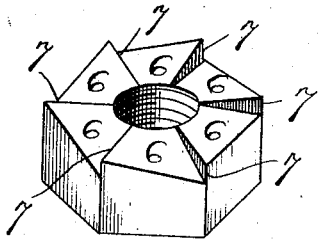
Figure 5:
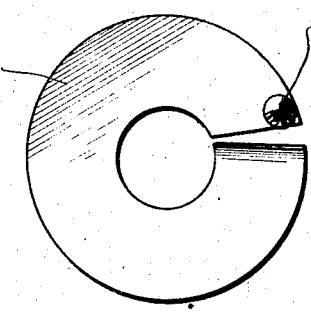

Figure 1 is a sectional view of a piece of work showing the improved nut lock applied thereto. Fig. 2 is a perspective view of the nut engaging washer showing the work-engaging spur or lug carried thereby. Fig. 3 is a similar view of the washer, taken from the opposite side to that shown in Fig. 2. Fig. 4 is a perspective view of the nut used in connection with the present invention. Fig. 5 is a plan view of the washer as shown in Fig. 2.

Referring to the accompanying drawings by numerals, 1 designates the work with which the bolt engages, said bolt being preferably, but not necessarily, provided with an exteriorily rounded head 2 and an enlarged neck 3, the body 4 of the bolt being provided with the threaded end portion 5.

The nut used in connection with the present invention may have the general contour as shown, or may be of any convenient or usual type so far as its outer face is concerned, but its inner face is provided with a ratchet surface, as best shown in Fig. 4 of the accompanying drawings. The ratchet surface of the nut is formed by providing the rear face of the nut with a plurality of inclined planes 6, the lower ends of which terminate in abrupt shoulders 7, said shoulders radiating from the center of the nut. The washer which coöperates with the described nut is of a flat, split ring type, designated in its entirety by the numeral 9, has an outstanding, pointed, spur or lug 9$^a$ projecting from one side, said spur or lug being preferably located at the outer end of the split portion 10. The other end of the washer is reduced in thickness, as indicated at 11 and is deflected in a direction opposite to the direction in which the spur or lug 9$^a$ projects, to form a dog or pawl 12 which coöperates with the ratchet of the nut to hold the nut in a locked position on the bolt.

In assembling the improved nut lock, the bolt is forced through the work to be held in the usual manner, and the washer 9 is placed on the nut with its lug or spur 9$^a$ in engagement with the work, as shown in Fig. 1. The nut is then screwed onto the bolt until its ratchet face is in binding engagement with the washer. When in this position the pawl or dog 12 will abut against one of the shoulders 7 and thereby prevent the nut being rotated to a bolt-releasing position.

As is shown more clearly in Fig. 1, the reduced portion of the washer which forms the dog or pawl 12 has a shoulder 13 at its junction with the body of the washer, which shoulder projects into the path of movement of the shoulders 7 of the nut, so that in the event of the pawl or dog becoming broken off, or buckled out of position, it will serve as a lock to prevent the nut being forced past the same.

It will be understood, of course, that as the dog or pawl is reduced in thickness, it will offer little or no resistance to the nut being rotated thereover when turning in a direction to tighten the nut, but as soon as an attempt is made to turn the nut to a loosening position, it will immediately spring into engagement with the straight side of the abutment shoulder, and thereby prevent rotation of the nut in a loosening direction.

It will be understood by reference to Fig. 1 that when the nut is tightly jammed onto the washer 9 with one of its teeth engaged by the spring pawl 12, the engaged tooth will be positioned across the split portion 10 of the washer, so that the shouldered portion 13 of said washer will have little or no pressure exerted upon it by the nut, and, therefore, the said washer will buckle slightly at the shouldered portion 13 sufficiently to cause said shoulder to rise and engage with one of the shoulders 7 of the nut, thereby securely holding the nut from rotation to a bolt-releasing position.

What we claim as our invention is:—

1. In a nut lock, the combination with a bolt, of a nut therefor provided with a radiating shouldered surface, and a transversely split washer carried by the bolt, one end of the washer being reduced to provide a spring pawl and abrupt shoulder for engagement with the shouldered surface of said nut, and a penetrating spur carried by the other end of said washer for engagement with the work.

2. In a nut lock, the combination with a bolt, of a nut therefor provided with a shouldered surface, and a split washer carried by the bolt one side of which has a reduced spring pawl and an abutment shoulder for engagement with the shoulders of the nut and the other side of said split washer being provided with a penetrating spur for engagement with the work.

In testimony whereof we hereunto affix our signatures in presence of two witnesses.

GEORGE L. SMITH.
HENRY F. GRAVER.
JOHN J. WIEGAND.

Witnesses:
BESSIE DOWELL,
P. I. DOLAN.